D. F. OLIVER.
SEAT SUSPENSION.
APPLICATION FILED APR. 28, 1914. RENEWED NOV. 3, 1917.
1,267,792.
Patented May 28, 1918.
8 SHEETS—SHEET 1.
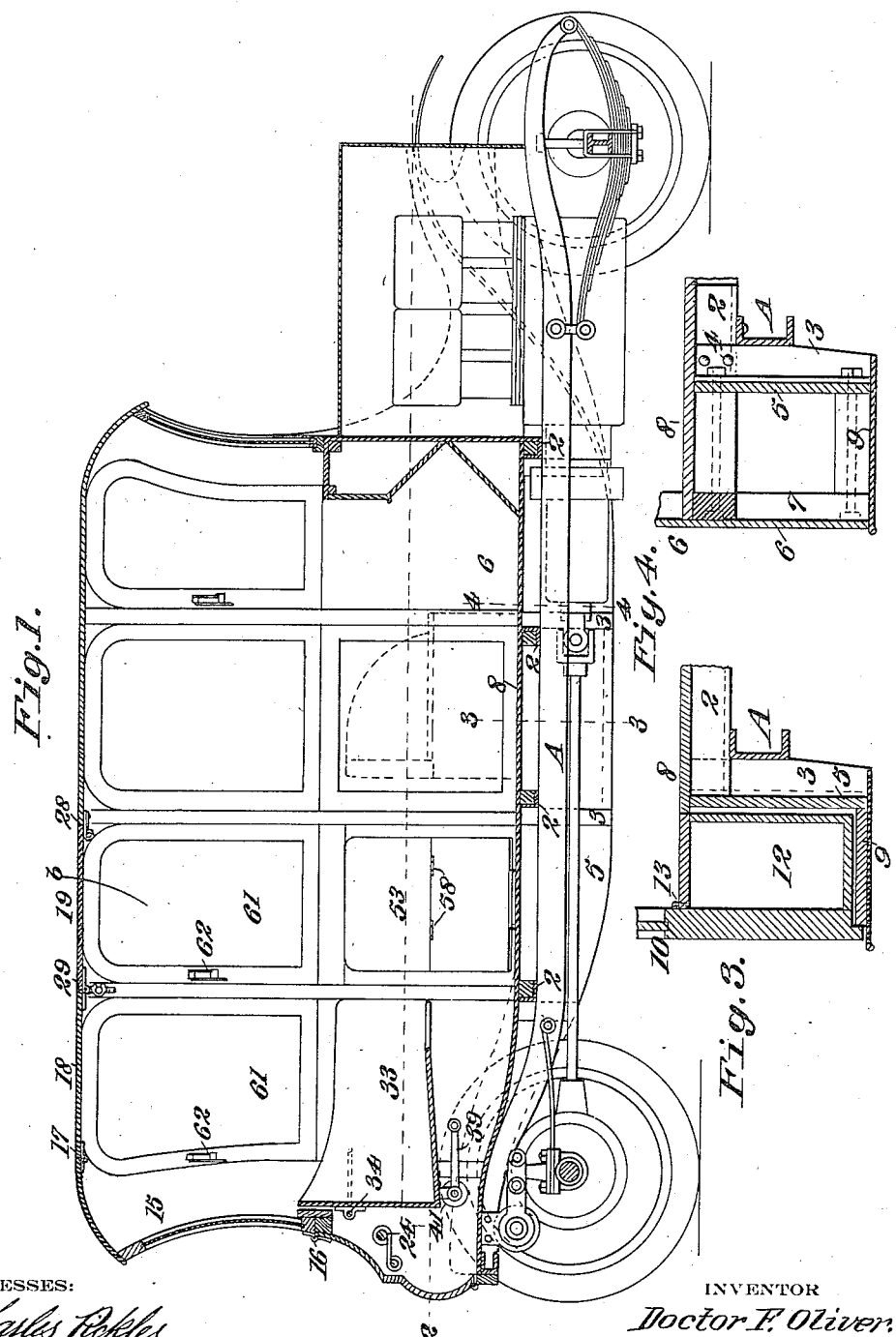

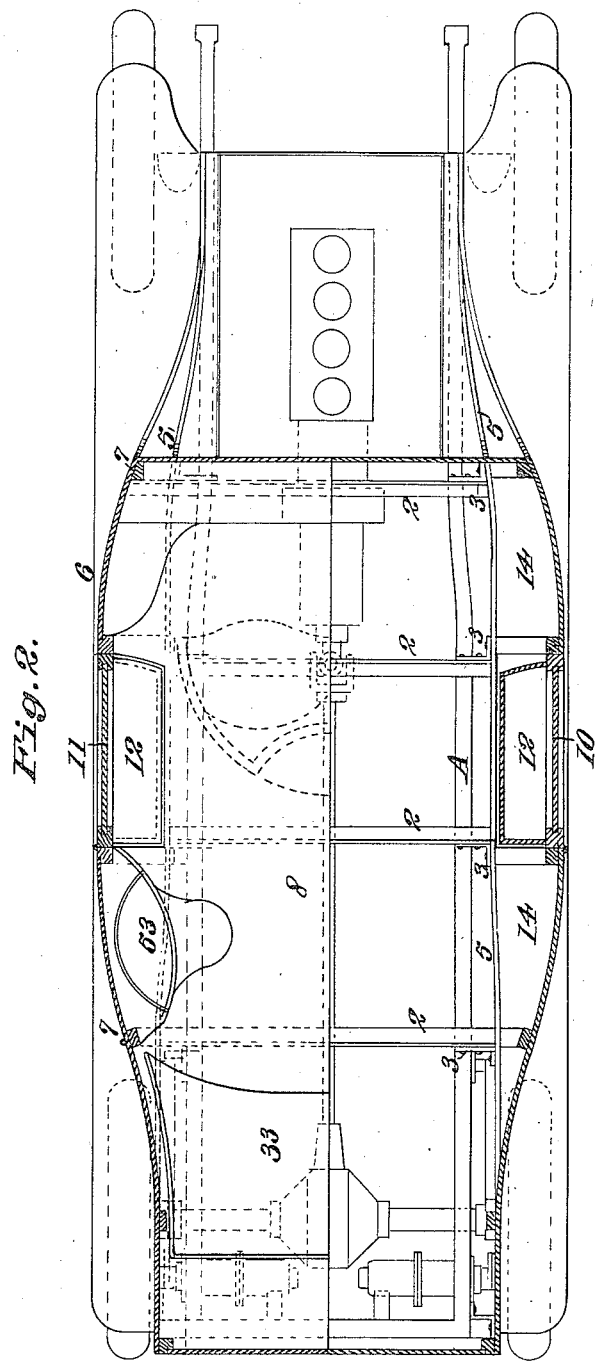

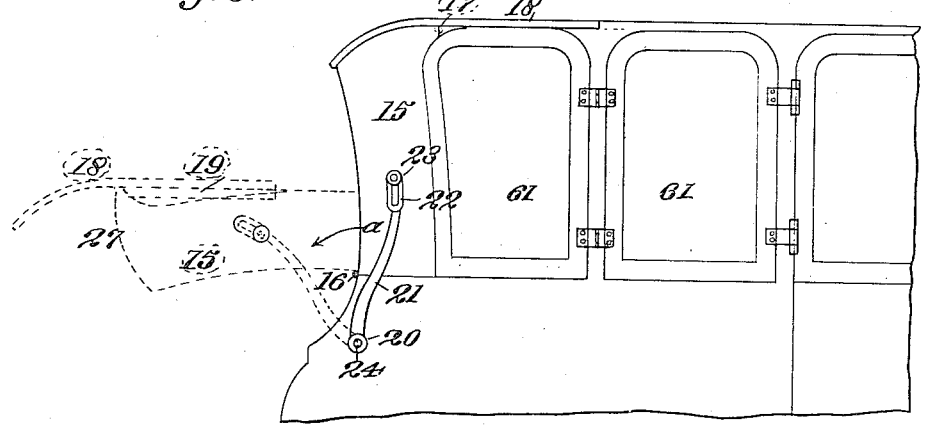
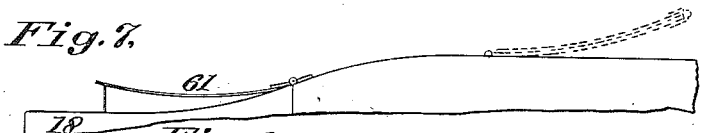
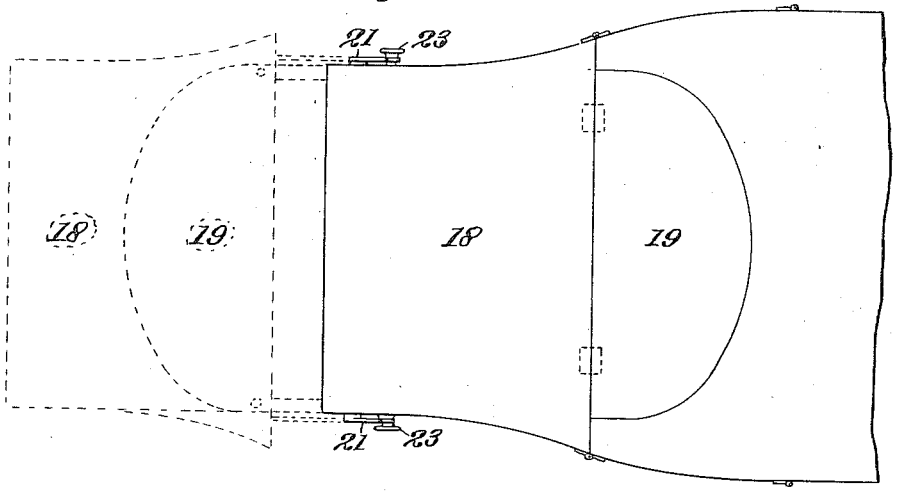
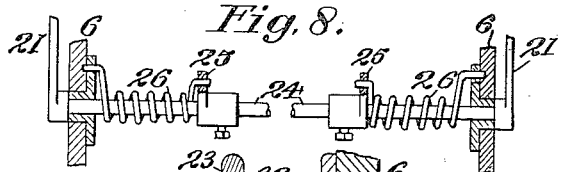
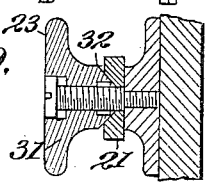

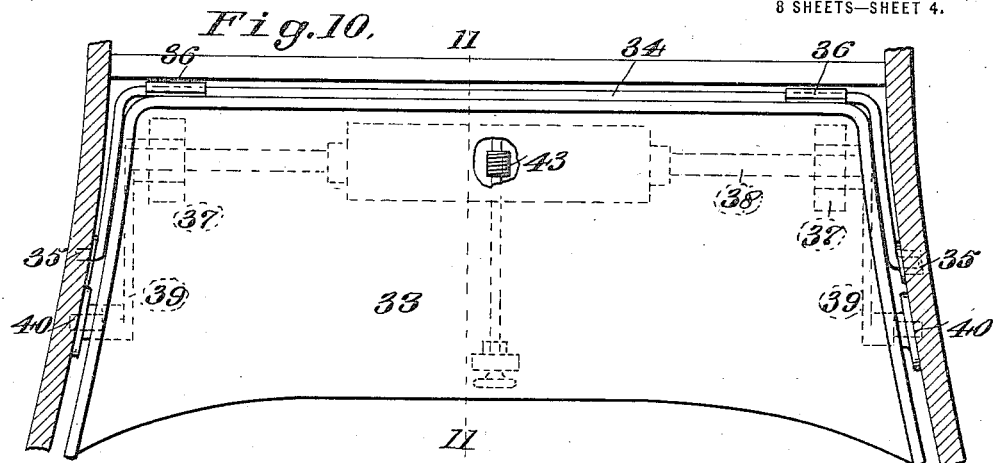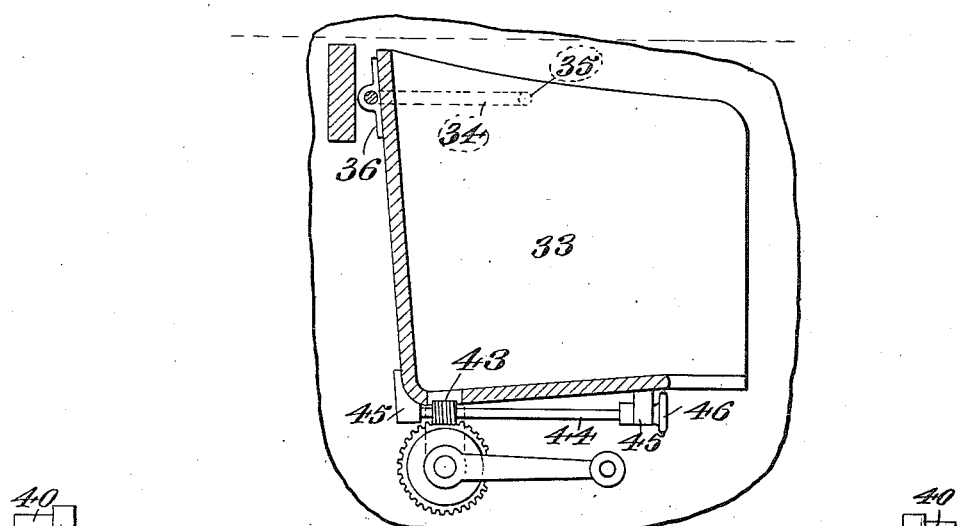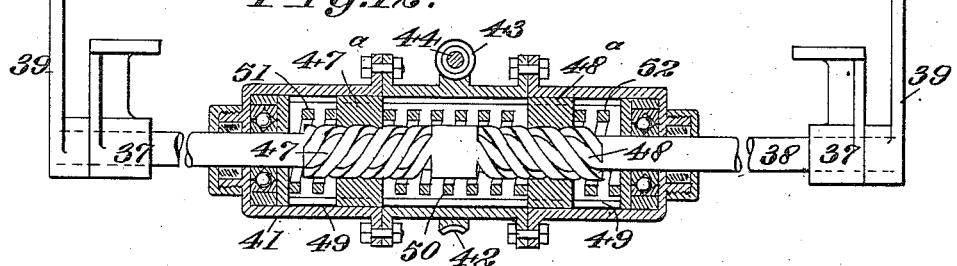

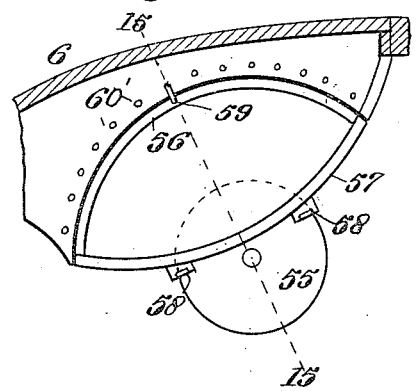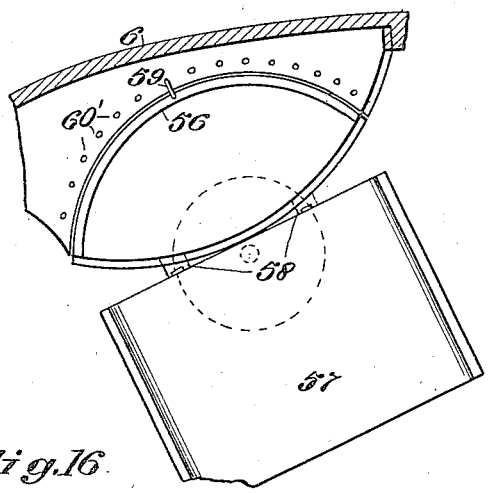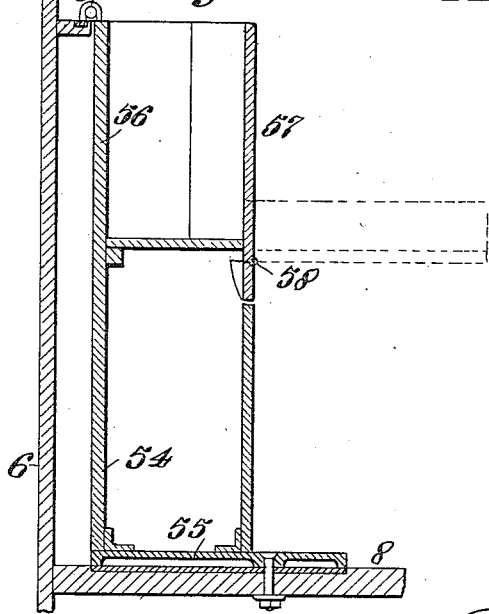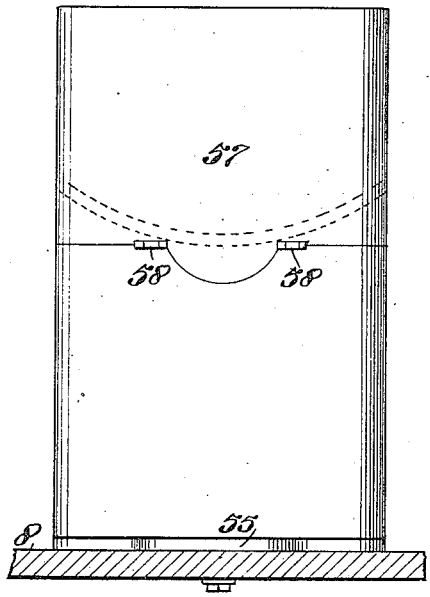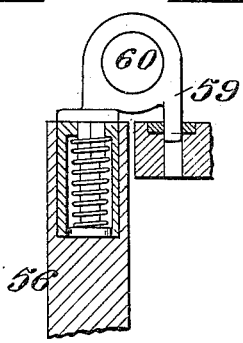

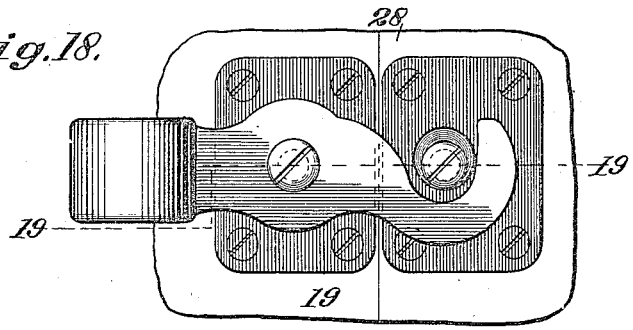
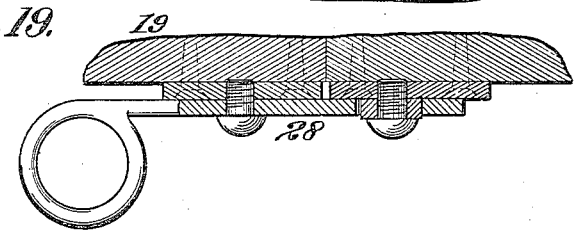
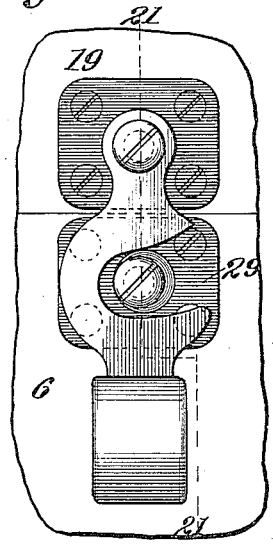
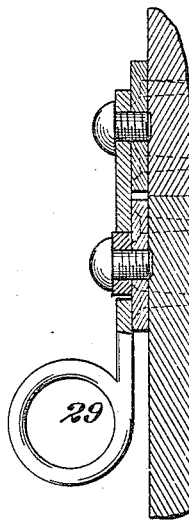
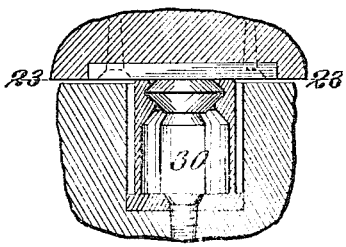
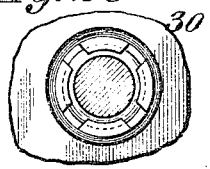

D. F. OLIVER.
SEAT SUSPENSION.
APPLICATION FILED APR. 28, 1914. RENEWED NOV. 3, 1917.
1,267,792.
Patented May 28, 1918.
8 SHEETS—SHEET 7.
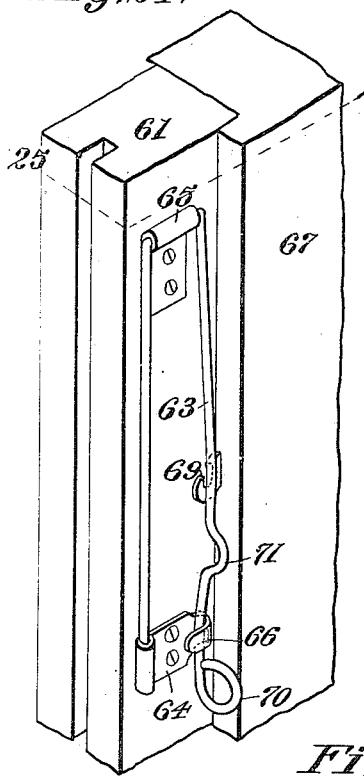
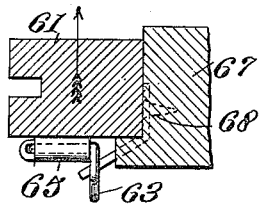
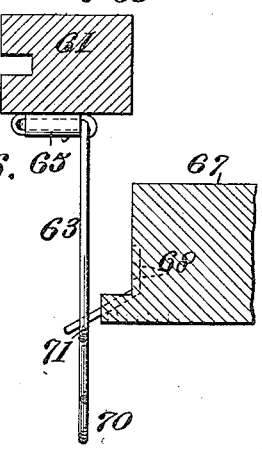
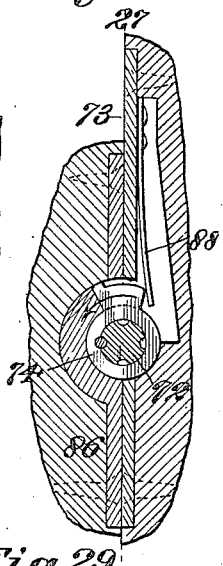
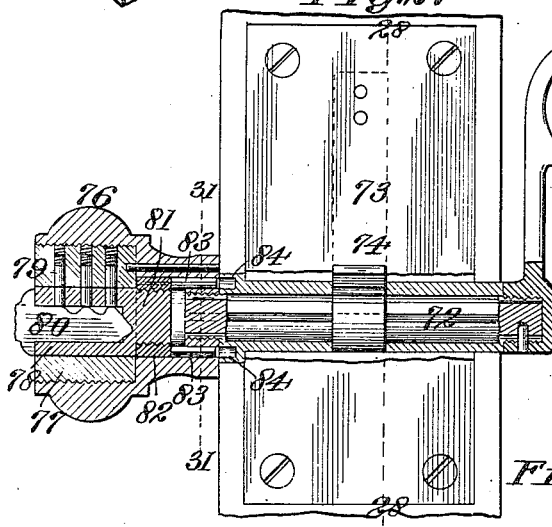
WITNESSES:
Charles Rikles
Thos Cashberg
INVENTOR
Doctor F. Oliver,
BY G. H. Strong.
ATTORNEY

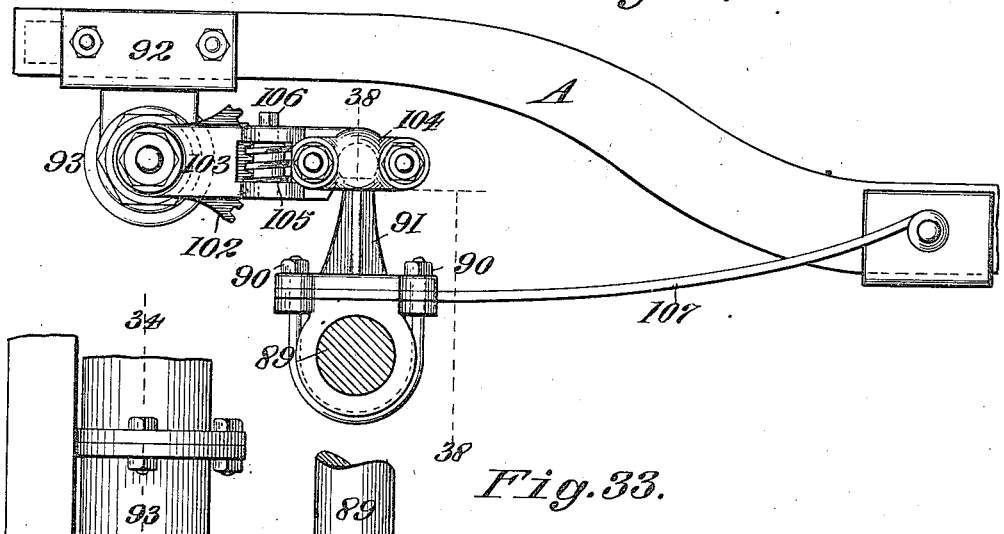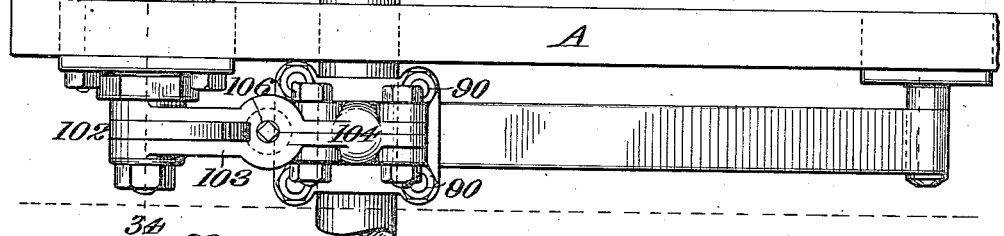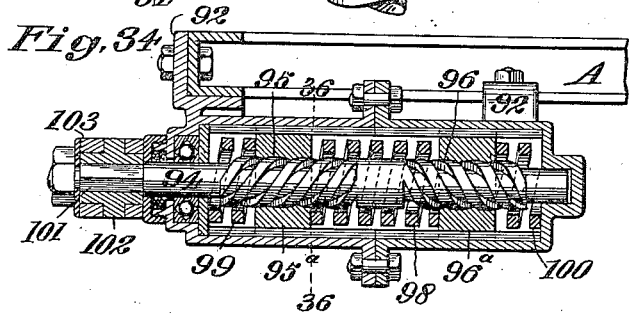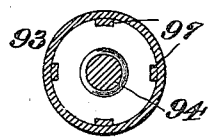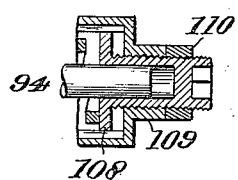

UNITED STATES PATENT OFFICE.

DOCTOR F. OLIVER, OF OAKLAND, CALIFORNIA.

SEAT SUSPENSION.

1,267,792. Specification of Letters Patent. Patented May 28, 1918.

Application filed April 28, 1914, Serial No. 834,931. Renewed November 3, 1917. Serial No. 200,195.

*To all whom it may concern:*

Be it known that I, DOCTOR F. OLIVER, a citizen of the United States, residing at Oakland, in the county of Alameda and State of California, have invented new and useful Improvements in Seat Suspensions, of which the following is a specification.

This invention relates to improvements in the body and chassis construction of motor vehicles.

It is one of the objects of the present invention to provide an improved form of chassis and body for motor vehicles, and the like, which is particularly constructed for the purpose of gaining greater rigidity and strength, graceful lines, and very much increased floor area within the car. Another object of the invention is to provide a novel form of folding top, with means for securing same in both a folded and an extended position. Another object of the invention is to provide a novel form of seat construction and a spring support for same. Further objects will hereinafter appear.

The invention consists of the parts and the construction and combination of parts as hereinafter more fully described and claimed, having reference to the accompanying drawings, in which—

Figure 1 is a central vertical longitudinal section through the car.

Fig. 2 is a plan section on line 2—2, Fig. 1, one half showing the seating arrangement of the car and the other half showing the chassis frame construction.

Fig. 3 is a section on line 3—3, Fig. 1.

Fig. 4 is a section on line 4—4, Fig. 1.

Fig. 5 is a partial side elevation showing the folding top construction.

Fig. 6 is a plan view of Fig. 5.

Fig. 7 is a plan view, partly broken away, showing the manner of folding the side windows.

Fig. 8 is a detail view of the folding top supporting shaft.

Fig. 9 is a detail of a lock used in connection with the folding top.

Fig. 10 is a plan view of the rear seat, showing its position with relation to the body of the car.

Fig. 11 is a cross section on line 11—11, Fig. 2.

Fig. 12 is a longitudinal section through the spring-actuated seat-supporting shaft.

Fig. 13 is a plan view of the pivoted side seat in closed position.

Fig. 14 is a similar view showing the pivoted side seat in open position.

Fig. 15 is a vertical transverse section on line 15—15, Fig. 13.

Fig. 16 is a front elevation of the pivoted side seat in closed position.

Fig. 17 is a detail section of a lock used in connection with the pivoted side seat.

Fig. 18 is a detail of a top locking latch used in connection with the folding top.

Fig. 19 is a horizontal section of same on line 19—19, Fig. 18.

Fig. 20 is an elevation of the side lock used in connection with the folding top.

Fig. 21 is a vertical section of same on line 21—21, Fig. 20.

Fig. 22 is a detail vertical section of a spring latch used in connection with the folding top.

Fig. 23 is a horizontal section on line 23—23, Fig. 22.

Fig. 24 is a detail view of a window sash and sash lock.

Fig. 25 is a plan section on line 25—25, Fig. 24.

Fig. 26 is a plan section on line 25—25, Fig. 24, showing the sash in the open position.

Fig. 27 is a central section of the door lock on line 27—27, Fig. 28.

Fig. 28 is a vertical cross section on line 28—28, Fig. 27.

Fig. 29 is a view of the keeper on the door jamb.

Fig. 30 is a perspective detail of the locking sleeve.

Fig. 31 is a cross section on line 31—31, Fig. 27.

Fig. 32 is a side elevation of the rear portion of the chassis frame.

Fig. 33 is a plan view of same.

Fig. 34 is a section on line 34—34, Fig. 33.

Fig. 35 is a section on line 38—38 of Fig. 32.

Fig. 36 is a vertical transverse section on line 36—36 of Fig. 34.

Fig. 37 is a detail view of a modification.

Referring to Figs. 1, 2, 3 and 4 of the drawings, A indicates the standard form of channel beams usually employed in the construction of chassis frames. Suitably secured on the top of said beams, and extending a considerable distance outside of same, is a plurality of cross beams or bars 2. Secured to the outer ends of each cross-bar, exterior to the channel beams A, is a rectangular-shaped bracket frame 3, and running parallel with the channel beams A, exterior to same and secured, as at 4, to the brackets 3, is a pair of vertically disposed sill plates 5. The sides of the body 6, together with the uprights 7, are secured in the outer ends of the cross-bars 2, and the floor of the body or car, indicated at 8, is supported upon the vertically disposed sill plates and cross-bars 2. The floor area of the car or body is in this instance considerably increased for the simple reason that the floor extends out to the sides of the body, as indicated in Figs. 2, 3 and 4, which in turn are positioned a considerable distance outside of the main channel beams of the chassis.

The running board 9 of the car is secured to the bottom of the bracket frames 3, but is only exposed at the door entrances of the car. 10 and 11 indicate the side doors of the car. Secured to each door is an extension 12 in the form of a receptacle, the shape of which is indicated in Fig. 2. The top of this receptacle is flush with the floor of the car and forms a portion of the floor when the door is closed. The bottom portion of the receptacle, which is above the running board, will completely inclose and hide same when the door is closed. The opening of the door, referring to Figs. 2 and 3, exposes only that portion of the running board 9 which extends across the door opening. This forms a step for the passengers when entering the car, but is otherwise completely hidden and covered, when the door is closed, by the receptacle 12.

The top of the receptacle, or that portion which registers with the floor of the car, is preferably hinged, as at 13, to gain admission to the interior of the receptacle, which receptacle may be used as a tool chest, or like device. The remaining spaces, on both sides of the car, shown at 14, which are formed between the vertical sill plates and the sides of the body, may be similarly used as receptacles for various purposes. The vertical sill plates 5 extend from end to end of the car and run substantially parallel with the main channel beams of the chassis. Great rigidity and strength are thus secured and the floor area is increased without increasing the width or otherwise changing the construction of the running gear or chassis frame.

The body is in this instance provided with a folding top, which is indicated in Figs. 1, 5, 6 and 7. The folding top consists of rear posts 15, hinged, as at 16, to the rear end of the car. Pivotally secured, as at 17, to the front edges of the posts 15 is a top section 18, and pivotally secured to the front edge of the top section 18 is a secondary section 19. Pivotally secured on each side of the body of the car, as at 20, is an arm 21. The upper end of each arm is slotted, as at 22, to straddle and engage a friction latch 23 secured on the rear post 15 of the folding top. Each arm 21 is secured to a shaft 24, a detail of which is shown in Fig. 8. This shaft extends through the end of the body, and secured to the shaft is a pair of set collars with projecting lugs 25, between which and the body of the car a pair of coil springs 26 is mounted. The tension of these coil springs is directed to resist the downward movement of the arms 21 in the direction of arrow $a$, or, in other words, to counterbalance the weight of the folded top when this is folded into the dotted line position indicated at 27, Fig. 5.

The folding of the top is accomplished in the following manner:

A latch 28, detail views of which are shown in Figs. 18 and 19, is first released. A second latch 29, detail views of which are shown in Figs. 20 and 21, is next released. This permits section 19 of the top to be folded down and back in the direction of arrow $b$ until it assumes a position directly under the top section 18, where it is secured by a latch 30, detail views of which are shown in Figs. 22 and 23.

The rear posts 15 of the folding top, referring to Fig. 5, are then pulled back in the direction of arrow $a$ about the hinge 16; the weight of same being counterbalanced by the spring tension on the arms 21. Section 18, together with section 19 which has already been folded into interlocking position with same, will fold clear back and assume the horizontal position indicated at 27, and the downward movement of the posts 15, with connected top sections 18 and 19, is limited by the length of the slots 22 in the upper ends of the arms 21, as the friction latches 23 form stops when they engage the lower ends of the slots 22. The parts may here be locked by turning a thumb-screw 31, shown in Fig. 9. The inner end of the thumb-screw 31 is conical in shape and the inner end of the slot 22 is slightly countersunk, as at 32, to form a seat into which the conical end of the thumb-screw 31 may register to lock the parts against upward movement.

The folding top may again be extended or raised into position by releasing the tension on the friction stops 23, or by turning the thumb-screws 31 out of locking position. The posts 15 may then be raised about the hinges 16 into the upright position. The top 18 is next swung into position and secured by the latches 29. The top section 19 is then released from the spring latch 30 and swung into the extended position shown in Fig. 1 where it is secured by the latch 28.

Very little manual labor or strength is needed in connection with the operation of this top as the weight of same is perfectly counterbalanced by the tension of the springs 26.

The mounting of the rear seat of the car forms another important feature of the present invention. This is accomplished in the following manner:

33 indicates the frame of the rear seat of the car which may be upholstered in any suitable manner not here shown. 34 indicates a U-shaped link, the outer ends of which are pivotally secured in the sides of the body at 35, while the inner end of the link is secured by brackets 36 to the back of the seat frame.

Suitably secured by brackets 37 to the bottom of the seat frame is a cross-shaft 38, the outer ends of which are secured in crank arms 39. The crank arms 39 are pivotally mounted in the sides of the body, as at 40. Surrounding the shaft 38 and completely inclosing same is a cylindrical-shaped casing 41, and secured to the outside of said casing is a worm wheel 42 with which a worm gear 43 engages. The worm gear 43 is secured upon a shaft, indicated at 44, which in turn is mounted in journal brackets 45 secured on the bottom of the seat frame. The outer end of said shaft is provided with a hand-wheel 46 which may be turned to change the position of the housing 41. The object of this will later be described.

The central portion of the shaft 38, interior of the casing, is left and right hand threaded, as indicated at 47 and 48, from a central point, and engageable with said threaded portions is a pair of nuts 47$^a$ and 48$^a$ which are grooved on their outer peripheries to engage keys 49 secured on the inner face of the cylindrical casing. Interposed between the nuts 47$^a$ and 48$^a$ is a coil spring 50, and interposed between the ends of the casing and the nuts is a pair of springs 51 and 52. The turning movement of shaft 38 in either direction will cause the nuts 47$^a$ and 48$^a$ to move in or out with relation to the center of the casing and consequently either compress the centrally disposed spring or the end springs 51 and 52.

Any weight on the rear set will have a tendency to cause the seat, which is supported by the crank arms 39 and the U-shaped link 34, to drop down about the pivot points of said link and arms. This movement is, however, resisted by the springs 51 and 52. The tension of said springs may be increased or decreased by turning the housing 41 through means of the hand-wheel 46 and worm gear 43, as before described. The tension of the springs may thus be adjusted to support two or three persons or vice versa.

A seat constructed and mounted in the manner shown is very easy riding as the jolts and rebounds are first absorbed by the chassis frame and then by the springs 50, 51 and 52.

The side seats of the car, generally indicated at 53, Fig. 1, and detailed in Figs. 13, 14, 15, 16 and 17 are also constructed in a novel manner. The side seat is here shown as consisting of a frame 54 which is supported on a swivel plate 55. The back portion 56 of the seat is rigid with the frame while the seat proper, indicated at 57, is adapted to be extended or closed up, as indicated in Fig. 15, said seat being pivotally secured to the main frame as at 58. This seat, when not in use, is closed up, as indicated in Figs. 13, 15 and 16, and the frame 54 is turned into the position indicated in Fig. 13 where it requires the least space possible. When it is desired to use the seat, it is accomplished by first turning it about the swivel plate 55 into the position indicated in Fig. 14. The seat proper is then folded down about the hinges 58. The position of the seat may be changed to any suitable angle and secured in position by a latch 59, indicated in Fig. 17. This latch is carried by the back frame 56 of the seat and may be lifted up and down by an eye extension 60 to be brought into engagement with any one of a series of perforations 60'. The seat when in the extended position may thus be locked in any suitable angular position and is, furthermore, prevented from turning when the car is traveling down an incline.

Means have also been provided in the present case for locking the window sashes, indicated at 61, and also for the purpose of securing same in a partly open position. This is accomplished by means of a latch, generally indicated at 62 in Figs. 1, 24, 25 and 26. The latch consists of a U-shaped section of spring wire 63, one leg of which is secured in brackets 64 and 65 secured upon the window sash. The lower bracket 64 is provided with a hook extension 66. Secured in the frame 67, as at 68, is an angularly disposed bracket having a notch 69 formed therein. The opposite leg of the U-shaped spring wire is looped, as at 70, on its lower end to form a hand grip and is, furthermore, provided with one or more notch-like bends 71.

If it is desired to lock the sash in the closed position shown in Figs. 24 and 25, it is accomplished by swinging one leg of the spring wire latch over the angularly disposed bracket 68 and forcing the lower end of said leg into engagement with the hook-like extension on the bracket 64. This locks the sash securely with relation to the frame and also prevents any rattling of the sash as it is held closed under a spring tension. If it is desired to secure the sash in a partly open position, as indicated in Fig. 26, for the purpose of securing ventilation within the car, it is accomplished by releasing the spring latch, with relation to the hook 66, and forcing the sash outwardly until latch 71 rides into register with the notch 69 on the stationary frame bracket. The outward movement of the sash causes the spring latch to assume an angular position which increases the spring tension of the latch sufficiently to prevent notch 71 to become accidentally disengaged with relation to the notch in the stationary angle bracket.

A novel form of door lock has also been provided in the present invention. This lock consists of a bolt 72 turnably mounted in a plate 73. Secured approximately in a central position with relation to plate 73 by the bolt 72 is a latch 74, and secured to the inner end of the bolt is a handle 75 by which the bolt and latch may be operated from the inside of the car.

The outer end of the bolt is suitably secured to a knob 76, in which is mounted a novel form of Yale lock 77. The Yale lock in this instance is provided with a barrel 78 and tumblers 79 of the usual construction, which are adapted to be operated and turned by a key 80. The novelty in connection with the Yale lock in the present instance consists in providing a threaded extension 81, on the inner end of the barrel, upon which is mounted an internally threaded sleeve 82 which is more particularly shown in Fig. 30.

Extending from the inner face of said sleeve is a pair of pins 83 which are adapted to be brought into register with sockets 84 formed in the end of the toothed plate indicated at 73. If it is desired to lock the door from the outside, it is accomplished by inserting the key 80 and turning the barrel. This causes the sleeve 82 to move in an inward direction and will consequently bring the pins 83 into register with the sockets 84 in the door plate. It will thus be impossible to turn knob 76, with connected bolt 72 and latch 74.

The latch 74 is in this instance engageable with a pocket 85 formed in a door framing plate 86. Entrance to pocket 85 is gained by moving the latch 74 over a cam face 87 which gives the latch an easy admission and at the same time secures it when once in position. A spring 88, shown in Fig. 28, secured on the rear side of the door plate 73 engages with the rear side of the latch and throws it into engagement with the latch 85 when these are brought into register. The door can thus be slammed closed and cannot be opened except by turning the bolt 82 either through the medium of the knob 76 or the handle 75.

The supporting of the chassis, with relation to the rear axle of the car, forms another important feature of the present invention. This is accomplished as follows: 89 indicates the rear axle of the car. Suitably secured to said axle by U-bolts 90 is a standard 91, on the upper end of which is formed a socket 91', particularly shown in Figs. 32, 33, 34 and 35.

Suitably secured to the channel beams A, near their rear ends, through the medium of brackets 92 is a cylindrical-shaped casing or housing 93, and journaled in said housing is a horizontally disposed shaft 94 which is provided with right and left-hand threaded sections 95 and 96. Engageable with said threaded sections is a pair of nuts 95$^a$ and 96$^a$ which are grooved on their outer peripheries and are engageable with keys 97 secured on the interior of the casing. These prevent the nuts from revolving and will consequently cause same to move in or out with relation to a central point on the shaft when the shaft is turned. Movement of the nuts in either direction is, however, resisted by a centrally disposed spring 98 and a pair of end springs 99 and 100.

Secured on the outer end of the shaft 94, as at 101, is a gear segment 102, and turnably mounted on the hub of said gear segment is a fork-shaped arm 103, on the outer end of which a socket bearing 104 is formed in which socket member 91' is journaled and secured. Journaled in arm 103 and intermeshing with segment 102 is a worm-gear 105. Formed on the upper end of the shaft upon which gear 105 is mounted is a square section 106 by which gear 105 may be turned. The gear 105, together with the segment 102, is provided for the purpose of adjusting the tension of the springs 98, 99 and 100.

By turning the worm-gear 105 it can be seen that movement will be transmitted to segment 102, causing this to turn shaft 94 in one direction or the other. This will cause the nuts 95$^a$ and 96$^a$ to move either in or out to compress the central spring and decrease the tension of the end springs, or vice versa. Any movement of the chassis with relation to the running gears or wheels of the car is resisted by the springs in both directions. The end springs 99 and 100 resist all downward movements while the central spring resists all rebounds. A radius rod 107 is employed in this instance for the usual purpose.

Fig. 37 shows a slight modification of the cylindrical-shaped housing 93 in which shaft 94 is journaled. Adjustable end plates 108 are provided in this instance for adjusting the tension of the end springs independent of the position of the nuts 95$^a$ and 96$^a$. This is accomplished by providing the end plate with a threaded sleeve section 109 which projects through the end of the casing. A nut or end is formed on said sleeve by which it may be turned to adjust the tension of the end spring or springs, and a jam nut 110 is provided for the purpose of locking it in the adjusted position.

Having thus described my invention, what I claim and desire to secure by Letters Patent is—

1. The combination with a vehicle body, of a pair of crank arms pivotally mounted therein, a shaft secured in the free ends of said arms, a seat, journal brackets on the bottom of said seat through which said shaft extends, means for guiding said seat against tilting movement on the shaft, and cushioning means associated with the shaft and seat for cushioning any up or down movement of the seat.

2. The combination with a vehicle body, of a pair of crank arms pivotally mounted therein, a shaft secured in the free ends of said arms, a seat, journal brackets on the bottom of said seat through which said shaft extends, means for guiding said seat against tilting movement on the shaft, a housing surrounding the shaft secured to the seat, and spring-actuated means in said housing to resist the turning movement of the shaft.

3. In combination with a vehicle and seat, of a seat supporting means comprising a rotatable threaded member movable with the seat, spaced springs arranged adjacent the threaded member, and nut means interposed between the springs and engaged with the threads of said member for movement to tension either spring on movement of the seat to and from normal position.

4. The combination with a vehicle body and seat, of a seat supporting means comprising a shaft connected to the seat and body for partial rotation, coiled spring means, compression means operable by the shaft for compressing the spring means axially, and manually operable means for adjusting the compression means.

5. The combination with a vehicle body and seat, of a seat supporting means comprising a shaft connected to the seat and body for partial rotation and provided with right and left threaded portions, a nut on each threaded portion of the shaft, a casing slidably engaged with the nuts and rotatable about the shaft, a spring between the nuts compressible by the latter on rotary movement of the shaft, and means for rotating the casing to vary the space between the nuts.

6. The combination with a vehicle body, of a pair of crank arms pivotally mounted therein, a shaft connecting the free ends of the arms, a seat journaled on the shaft, oppositely threaded parts on the shaft, a nut member on each threaded part, a casing surrounding the nut members, coiled springs interposed between the nut members and between each nut member and the adjacent end of the casing, and means for effecting relative turning between the nut members and the threaded parts to vary the tension of the springs.

7. The combination with a vehicle body of a relatively movable member, and a cushioning means between the body and member including a coiled spring and a tensioning element for compressing the spring axially and operable on relative movement between the body and member.

8. The combination with a vehicle body, of a relatively movable member, and a cushioning means between the body and member including a threaded element, a nut on the latter, and a spring adapted to be tensioned by the nut on relative movement between the body and member.

9. The combination with a vehicle body, of a relatively movable member, and a cushioning means between the body and member including a threaded element, a coiled spring thereabout, a nut on the threaded element adapted to advance on relative rotation of the latter to vary the tension of the spring, and means for effecting relative rotary movement between the threaded element and nut on relative movement between the body and member.

10. In combination with a vehicle and seat, of a seat supporting means comprising a rotatable threaded member movable with the seat, spaced springs arranged about the threaded member, nut means engaged with the latter and interposed between the springs, a casing forming end supports for the springs and slidably engaging with the nut means, and means for holding the casing against rotation with the threaded member.

11. In combination with a vehicle and seat, of a seat supporting means comprising a threaded shaft, means supporting the shaft for rotary movement, a casing surrounding the threaded part of the shaft, nut means engaged with the threaded shaft and arranged in the casing for sliding movement, a coiled spring arranged on each side of the nut means and bearing thereon and against the adjacent end of the casing, and means for holding the casing against rotation with the shaft.

12. In combination with a vehicle and seat, of a seat supporting means comprising a threaded shaft, means supporting the shaft for rotary movement, a casing surrounding the threaded part of the shaft, nut means engaged with the threaded shaft and arranged in the casing for sliding movement, a coiled spring arranged on each side of the nut means and bearing thereon and against the adjacent end of the casing, and means for holding the casing against rotation with the shaft and adapted to adjust the casing about the shaft to vary the tension of the springs subjected thereto by the nut means.

13. In combination with a vehicle and seat, of a seat supporting means comprising a threaded shaft, means supporting the shaft for rotary movement, a casing surrounding the threaded part of the shaft, nut means engaged with the threaded shaft and arranged in the casing for sliding movement, a coiled spring arranged on each side of the nut means and bearing thereon and against the adjacent end of the casing, a gear on the casing, and a worm gear journaled on the seat and meshing with the gear to hold the casing against rotation with the shaft and to effect an adjustment of the casing about the shaft.

14. In combination with a vehicle and a seat, a shaft rotatably carried by the seat and swingingly mounted on the vehicle whereby the seat is mounted for movement, said shaft being provided with oppositely threaded portions, a sectional casing surrounding the threaded portions of the shaft and comprising end sections and an intermediate section, spaced nuts slidable in the casing and each engaged with a respective threaded portion of the shaft whereby on rotation of the latter the nuts will move in opposite directions, a coiled spring interposed between the nuts, other coiled springs one of which is disposed in each end section of the casing to abut the adjacent nut, a peripherally arranged gear on the intermediate section of the casing, a worm gear journaled on the seat and meshing with the gear to adjust the casing around the shaft and adapted for holding the former against rotative movement with the latter, means for rotating the worm gear, and a U-shaped link pivoted to the upper portion of the seat and having its free terminals pivoted in the vehicle.

In testimony whereof I have hereunto set my hand in the presence of two subscribing witnesses.

DOCTOR F. OLIVER.

Witnesses:
W. W. HEALEY,
M. KANDERER.